(12) United States Patent
Decker

(10) Patent No.: US 8,002,216 B2
(45) Date of Patent: Aug. 23, 2011

(54) SOLAR POWERED WING VEHICLE USING FLYWHEELS FOR ENERGY STORAGE

(76) Inventor: Darwin Kent Decker, Hacienda Heights, CA (US)

( * ) Notice: Subject to any disclaimer, the term of this patent is extended or adjusted under 35 U.S.C. 154(b) by 596 days.

(21) Appl. No.: 12/139,402

(22) Filed: Jun. 13, 2008

(65) Prior Publication Data

US 2008/0308685 A1    Dec. 18, 2008

Related U.S. Application Data

(60) Provisional application No. 60/934,772, filed on Jun. 15, 2007.

(51) Int. Cl.
*B64C 13/24* (2006.01)
*B64D 27/24* (2006.01)

(52) U.S. Cl. ............. 244/58; 244/79; 244/99.2

(58) Field of Classification Search ........... 244/58, 244/59, 99.2, 75.1, 53 R, 165, 172.7, 36, 244/79; 310/64
See application file for complete search history.

(56) References Cited

U.S. PATENT DOCUMENTS

| | | | | |
|---|---|---|---|---|
| 1,245,902 A | * | 11/1917 | Gretsky | 244/58 |
| 3,089,670 A | | 5/1963 | Johnson | |
| 4,032,807 A | * | 6/1977 | Richter | 310/64 |
| 4,415,133 A | | 11/1983 | Phillips | |
| 4,649,287 A | * | 3/1987 | Nola | 290/1 R |
| 4,697,761 A | | 10/1987 | Long | |
| 5,104,062 A | * | 4/1992 | Glaze | 244/99.2 |
| 5,269,288 A | * | 12/1993 | Stirbl et al. | 244/58 |
| 5,518,205 A | | 5/1996 | Wurst et al. | |
| 5,614,777 A | * | 3/1997 | Bitterly et al. | 310/74 |
| 5,810,284 A | | 9/1998 | Hibbs et al. | |
| 6,534,887 B1 | * | 3/2003 | Peczalski et al. | 310/90.5 |
| 6,568,633 B2 | * | 5/2003 | Dunn | 244/59 |
| 6,742,741 B1 | * | 6/2004 | Rivoli | 244/58 |
| 6,792,259 B1 | * | 9/2004 | Parise | 320/109 |
| 7,198,225 B2 | | 4/2007 | Lisoski et al. | |
| 2005/0017127 A1 | * | 1/2005 | Minh | 244/62 |

* cited by examiner

*Primary Examiner* — Galen Barefoot
(74) *Attorney, Agent, or Firm* — Kirk A. Buhler; Buhler & Associates

(57) ABSTRACT

A solar powered air vehicle that can stay aloft for indefinite periods of time. The vehicle employs photovoltaic solar cells for primary power and high speed counter-rotating flywheels for energy storage and steering of the vehicle. The flywheels are placed in the wing to reduce airfoil drag. A control law provides three-axis stabilized control of the vehicle by controlling propeller pitch to vary the speeds of the flywheels.

19 Claims, 4 Drawing Sheets

SOLAR POWERED WING VEHICLE USING FLYWHEELS FOR ENERGY STORAGE

CROSS REFERENCE TO RELATED APPLICATION

This application claims the benefit of Provisional 60/934,772 filed Jun. 15, 2007 the entire contents of which is hereby expressly incorporated by reference herein.

FIELD OF THE INVENTION

This invention relates generally to air vehicles that are solar powered and, more particularly, to an air vehicle that stores the solar energy in a system of flywheels that also function to steer the air vehicle.

BACKGROUND OF THE INVENTION

As is well understood, heavier-than-air vehicles, other than gliders, require power to generate the thrust that allows them to move through the air in order to create lift and stay aloft. Most of these air vehicles use reciprocating or jet engines that burn fossil fuels as the primary power source. Although, these engine powered air vehicles provide high performance and maneuverability, they are limited in range and time aloft by the amount of fuel that they can carry. Gliders, on the other hand, may stay aloft for indefinite periods of time, but are limited in utility by the unpredictable nature of the prevailing winds.

With the threat of global warming and increasing gasoline prices, the interest in solar powered aircraft using photovoltaic solar cells has increased. Photovoltaic technology is well established, having been used as the primary power source on satellites for many years. An advantage of a solar powered aircraft over an engine powered aircraft is that it can stay aloft for indefinite periods that may extend into years of time similar to the operation of a satellite. Further, the solar powered aircraft can perform many of the present functions of a satellite without the cost of an expensive launch vehicle and without eventually creating orbital waste. The solar powered aircraft can return to earth for maintenance and be re-configured for a variety of missions. Typical applications include surveillance and tracking, homeland security, communications, oceanography, and meteorology. Many of these applications require operation at high altitudes greater than 60,000 feet where air breathing engine are less efficient.

In order to operate during periods of darkness, solar powered aircraft must employ a means to store the energy created by the solar cells. Batteries and fuel cells are the devices that have been employed, to date, on solar powered aircraft to store energy. Key drivers for energy storage devices used in this application are long cycle life, high energy per unit weight, and high efficiency. Primary fuel cells must store hydrogen and oxygen for fuel and therefore are limited in life in a similar fashion as fuel burning engines. Regenerative fuel cells have not demonstrated long cycle life at this time. Recent advances in Lithium-Ion, Lithium-Sulfur, and Lithium-polymer batteries has increased energy per unit weight, but the available energy of these technologies over the cycle life and the harsh environment required for long life high altitude air vehicles is still questionable. As a consequence, batteries must be thermally managed, particularly at high altitudes where temperatures can reach −76 degrees Fahrenheit, thereby consuming energy that could be used by payloads. To date, solar powered flight for indefinite periods of time has not been achieved with batteries or fuel cells.

A more appropriate energy storage device for use with long life solar powered airplanes is a high speed flywheel with a composite rotor and magnetic bearings. High speed flywheels provide superior energy per unit weight than batteries in applications where long cycle life is required. Composite rotors have demonstrated over 112,000 cycles in laboratory tests. Furthermore, flywheels provide a more efficient energy to thrust ratio for this application than batteries since batteries store energy chemically. Converting electrical energy to chemical energy, then back to electrical energy and then to rotational energy is inherently less efficient than converting the electrical energy directly to rotational energy in the flywheels and then using torque conversion to apply the energy directly to rotating propellers. Furthermore, flywheels produce moments and gyroscopic couples that can be used to steer the aircraft and eliminate or reduce the need for additional steering devices such as flaps, fuselage and a tail section that create additional drag on the vehicle. To date, flywheel energy storage has not been used in solar powered air vehicles.

The following patents disclose solar powered aircraft that store the solar power in batteries or similar chemical based storage methods. U.S. Pat. No. 3,089,670 issued May 14, 1963 to E. G. Johnson, U.S. Pat. No. 4,415,133 issued Nov. 15, 1983 issued to William H. Phillips, U.S. Pat. No. 4,697,761 issued Oct. 6, 1987 to David E. Long, U.S. Pat. No. 5,518,205 issued May 21, 1996 to Wurst et al U.S. Pat. No. 5,810,284 issued Sep. 22, 1998 to Hibbs et al. and U.S. Pat. No. 7,198,225 issued Apr. 3, 2007 to Lisoski et al. A major problem with storing the power in batteries is the conversion of the energy solar power into battery power and back into solar power. An additional drawback is operation of batteries at high altitude where the temperature is colder. Energy from the batteries must also be used to keep the batteries warm for optimal operation.

In U.S. Pat. No. 7,198,225, Lisoski, et al., achieved high altitude solar powered flight with fuel cell energy storage for several hours. In U.S. Pat. No. 5,921,505, Spector derives a method for reducing disturbances in energy storage flywheels in solar powered craft such that the flywheels do not interfere with an on-board dynamic control system. The Spector patent does not address the need for efficiently flying a solar powered air vehicle using flywheels as the only method for controlling the vehicle.

Therefore, a need remains to develop a solar powered air vehicle that can fly for extended periods of time which overcomes the disadvantages discussed above and previously experienced. Such a vehicle must be extremely lightweight with a high lift, low drag platform. The power train for this vehicle must provide highly efficient conversion of energy to thrust.

BRIEF SUMMARY OF THE INVENTION

It is an object of the present invention to provide a solar powered air vehicle that can stay aloft for indefinite periods of time. An advantage of a solar powered aircraft over an engine powered aircraft is that it can stay aloft for indefinite periods that may extend into years of time similar to the operation of a satellite. Further, the solar powered aircraft can perform many of the present functions of a satellite without the cost of an expensive launch vehicle and without eventually creating orbital waste. The solar powered aircraft can return to earth for maintenance and be re-configured for a variety of missions. Typical applications include surveillance and tracking, homeland security, communications, oceanography, and meteorology. Many of these applications require operation at high altitudes greater than 60,000 feet where air breathing engine are less efficient.

It is another object of the present invention to provide a low drag, high lift platform for a solar powered air vehicle. Since the flywheels can be placed horizontally within the wing structure the overall height of the wing is not compromised. Flywheels produce torques that can be used to steer the aircraft and eliminate the need for additional steering devices such as flaps, fuselage and tail section that creates additional drag on the vehicle.

It is another object of the present invention to reduce the weight of a solar powered air vehicle. The use of a flywheel provides the benefit of reduced weight. High speed flywheels provide superior energy per unit weight than batteries in applications where long cycle life is required. Composite rotors have demonstrated over 112,000 cycles in laboratory tests The use of flywheels to steer the vehicle eliminates the need for flaps, ailerons, and tail section as well as the associated actuators, drivers, wiring and electronics required to operate these devices.

It is still another object of the present invention to provide highly efficient conversion of energy to thrust for a solar powered air vehicle. The conversion of energy from the rotating flywheel to the propeller is highly efficient and the only loss in energy is from the transmission. Flywheels provide a more efficient energy to thrust ratio for this application than batteries since batteries store energy chemically. Converting electrical energy to chemical energy, then back to electrical energy and then, in turn, to rotational energy is inherently less efficient than converting the electrical energy directly to rotational energy in the flywheels and translating that energy to the propellers through torque conversion.

It is still another object of the present invention to provide energy storage and steering of an air vehicle using flywheels. Flywheels produce torques and moments that can be used to steer the aircraft and eliminate the need for additional steering devices such as flaps, fuselage and a tail section that create additional drag on the vehicle. To date, flywheel energy storage has not been used in solar powered air vehicles.

It is still another object of the present invention to substantially eliminate the need for a fuselage, tail section, and flaps in a solar powered air vehicle. Control of flywheels torques in conjunction with propeller speed and pitch provides three-axis stable control of the vehicle, thus eliminating the need for conventional control mechanisms. In alternate configurations, flywheel torques can be combined with conventional control mechanisms to enhance overall control of the vehicle.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
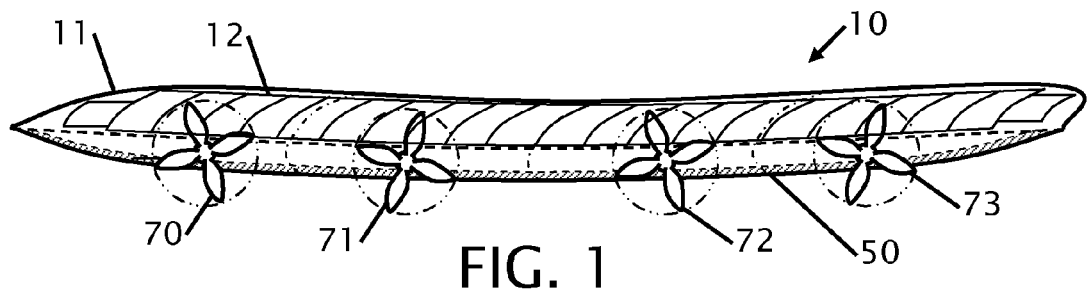
FIG. 1 shows a configuration of the solar powered air vehicle and the location of major components

The proposed vehicle 10, as shown in FIG. 1, is an unmanned high altitude long endurance air vehicle that is designed to stay aloft for an indefinite period of time (>5 years) without fuel. The vehicle will be able to hover over a single geographical location at altitudes greater than 60,000 feet, thus performing many of the tasks now performed by geosynchronous satellites, only at greater reduced cost. In addition, the vehicle can be returned to ground for maintenance and re-use in other missions, thereby eliminating orbital waste. Since the vehicle flies at lower altitudes than satellites, it provides reduced latency (delay times) than those of satellites, and it also provides the opportunity for higher sensor resolution with less power.

The vehicle10 is designed for cruise as opposed to climb, and, therefore, it exhibits many of the characteristics of a glider with a high lift, low drag platform. It is not intended to be a high performance airplane that can travel at high speeds and make sharp maneuvers. Its primary function is to reach a high altitude and stay there for a long period of time while transmitting and receiving information. The vehicle receives its primary power from the sun by means of photovoltaic solar cells. For operation during eclipse periods, energy is stored in high speed flywheels with high strength composite or metal rotors and magnetic or mechanical bearings. All of the energy is stored in the flywheels and not in batteries.

Figure 2:
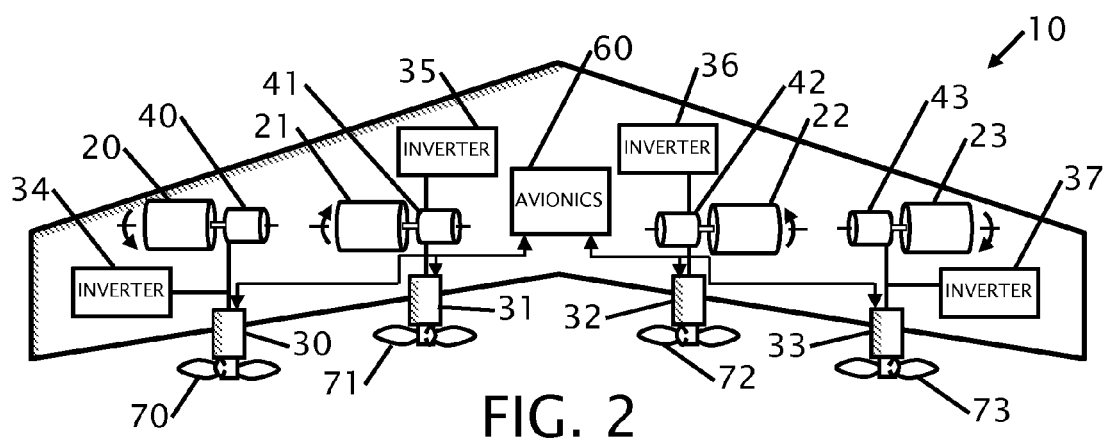
FIG. 2 shows a top view of a configuration of the solar powered air vehicle and the location of the major components.

The vehicle 10 platform design is a horizontally extending wing section that is also known as a flying wing as shown in FIGS. 1 and 2. The solar collecting cells 12 are disposed or embedded in the top surface 11 of the wing. There are two sets of counter-rotating pairs of flywheels 21-23 connected to motor/generators 40-43 that are oriented with their spin axis along the pitch axis of the wing. Both flywheel pairs are aligned with the center of gravity (CG) of the wing with respect to the pitch axis. Four push-type propellers 70-73 provide the propulsion for the wing.

Figure 3:
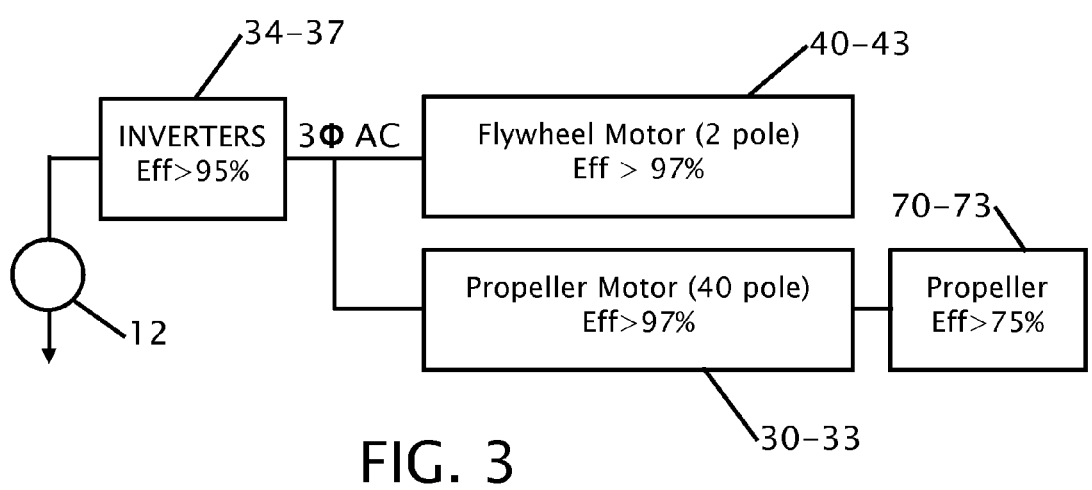
FIG. 3 shows a block diagram of the vehicle power train.

The platform design is a flying wing 11 as shown in the top view in FIG. 2. The solar cells 12 (from FIG. 1) are embedded in the top surface of the wing. It is also contemplated, as an option, that the wing includes solar cells on the bottom of the wing 50. A similar optional feature, not in the baseline design, would be to embed receptors on the bottom of the wing 50 to allow reception of laser power beamed from the ground. Four flywheels 20-23 lay within the wing so as not to disturb the wing airfoil characteristics. It is also contemplated that more than four flywheels 20-23 may be used for large vehicles. Motors and pitch controllers 30-33 each drive four independent push-type propellers 70-73 to provide the propulsion for the wing. The motors 30-33 are disposed within or on the horizontally extending wing section. These propellers 70-73 are shown with four blades, but propellers with more or less than four blades are contemplated based upon the desired performance characteristics of the vehicle and the propellers. The pitch angle of the propellers 70-73 are controllable to steer the vehicle and alter the thrust from each propeller. Since the spinning rate of the flywheels 20-23 varies over the energy cycle, the pitch angle of the propellers is altered to maintain a consistent velocity of the vehicle and optimizes propeller efficiency. The solar cells 12 convert the sun's energy to dc electrical power that is, in turn, converted to three phase ac power by solid state inverters 34-37 that simultaneously put energy into the flywheels 20-23 while driving the propeller motors 30-33. An Avionics control system 60 provides control of power from the solar collectors and inverters to the flywheels 20-23, propeller motors 30-33, and pitch drive system. The avionics is described in more detail herein. A block diagram of the power train is shown in FIG. 3. A suite of avionics 60 contains the vehicle controller as well as the transmitters and receivers necessary to communicate with the vehicle. The controller collects sensor data and performs the control law as well as vehicle diagnostics to determine state-of-health. The vehicle can be flown from the ground or will fly autonomously.

The solar cells 12 convert the sun's energy to dc electrical power that is, in turn, converted to three phase ac power by a solid state inverter that simultaneously puts energy into the flywheels 20-23 while driving the propeller motors 30-33. A block diagram of the power train is shown in FIG. 3. The electrical energy from the inverter is transformed to rotational energy in the flywheels by means of a motor 40-43 that is aligned with the spin axis of the flywheels to provide the function of providing propulsion. The motors 40-43 acts as generators during eclipse periods to deliver energy to the propeller motors 30-33 that turn the propellers.

The block diagram in FIG. 3 is a simplified version showing the basic conversion from the solar cell(s) 12 and drive components of the vehicle, and more elaborate control elements are contemplated. The electrical energy from the inverters 34-37 is transformed to rotational energy in the flywheel 20-23 by means of a motor that is aligned with the spin axis of the flywheels. The motor 40-43 acts as a generator during eclipse periods to deliver energy to the propellers. The efficiency of the overall power train is greater than 92%, thereby accomplishing the goal of a high energy to thrust ratio.

A feature of the design is the torque/speed conversion from the flywheels 20-23 to the propellers. The flywheel spin speeds range from 20,000 revolutions per minute (RPM) to 60,000 RPM or greater, while the propeller 70-73 rotational speeds are in the range of 1000 RPM. This torque/speed conversion is accomplished by using a 2 pole motor/generator 20-23 design for the flywheel and a 40 pole (or 160 or greater) design for the propeller motor 30-33. In order to transfer energy into and out of the flywheel, the flywheel speeds must vary over a three to one ratio. This ratio can be reduced to less than three to one at the expense of increasing the size and weight of the flywheel 20-23. Since the propeller speed is synchronized with the flywheel speed, this means that the propeller speed will also vary over a three to one range. However, the vehicle wants to fly at a fixed speed that reduces the overall drag and thus the power required to propel it. In order to accomplish fixed vehicle speed with varying propeller rotational speeds, the propeller pitch is varied. An alternate approach, as a part of this invention, is a speed control circuit between the flywheel motor and the propeller motor with fixed pitch propellers.

The angular momentum of the flywheel(s) is combined with thrust from the propeller to steer said vehicle. The flywheel provides energy to the motor/generator during periods of limited sunlight and or darkness thereby converting kinetic energy to electrical energy.

Figure 4:
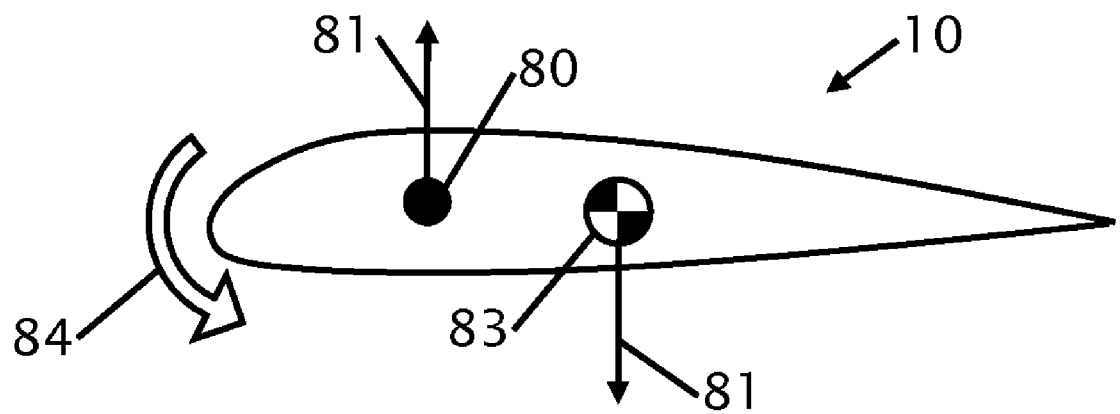
FIG. 4 shows the forces exhibited on an aerodynamic wing.

When a spinning wheel such as the flywheel stores and discharges energy, moments are produced around its spin axis. The magnitude of the moment at any specific instant is proportional to the angular acceleration of the wheel. A key strategy in the design of the vehicle is to use the flywheel moments combined with the propeller thrusts to steer the vehicle. In addition, the wheels will generate gyroscopic couples during turning maneuvers that can be used to create bank angles. If successful, this strategy will eliminate the need for flaps and a tail section and, in turn, the weight and drag contributed to these components. However, using the flywheels for both energy storage and vehicle control does incur a penalty in the flywheel design in that some "head room" must be allowed for wheel speed differentials in order to steer the vehicle. A second strategy, here, is to align the flywheels in such a fashion as to minimize the flywheel "head room" required to steer the vehicle. The forces exhibited on a wing 10 in flight are shown in FIG. 4. The lift forces 81 are represented by a vector through the aerodynamic center 80 and a pitching moment created by the uneven pressure on the upper and lower surfaces of the wing airfoil. In most airfoils, the pitching moment creates a nose-down 84 effect on the vehicle. If the center of gravity (CG) 83 of the vehicle is located aft of the aerodynamic center 80, then the CG 83 can be located such that the moment about the aerodynamic center 80 due to the vehicle weight 81 can counter the pitching moment at a given angle of attack and the vehicle will fly in a stable fashion at this angle of attack. A strategy of this design is to achieve this balanced condition during level flight.

Figure 5:
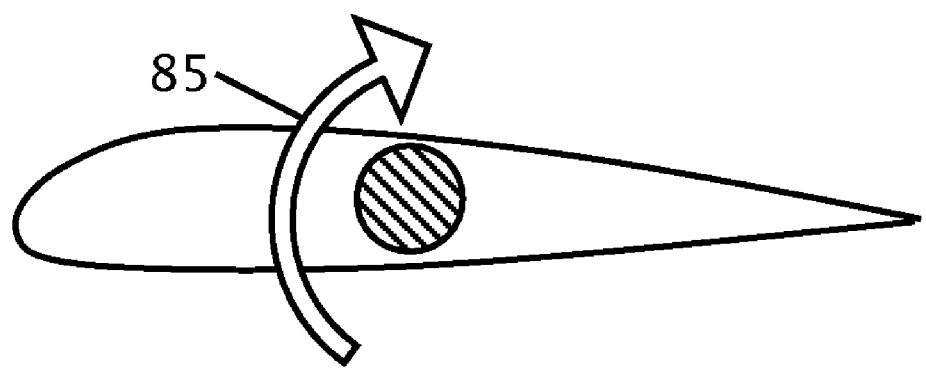
FIG. 5 shows the net flywheel moments produced on the wing in the pitch axis.

However, if the angle of attack increases, then the lift increases and the wing is no longer in a stable condition, requiring an external force to return the wing to a stable state. In conventional aircraft, this function is performed by the tail section of the vehicle. A basic feature of this design is to counter the lift variations with the net moments created by the difference in individual angular accelerations of the flywheel counter-rotating 85 pair as shown in FIG. 5. In this fashion, the flywheels provide pitch control for the vehicle and eliminate the need for a tail section.

Figure 6:
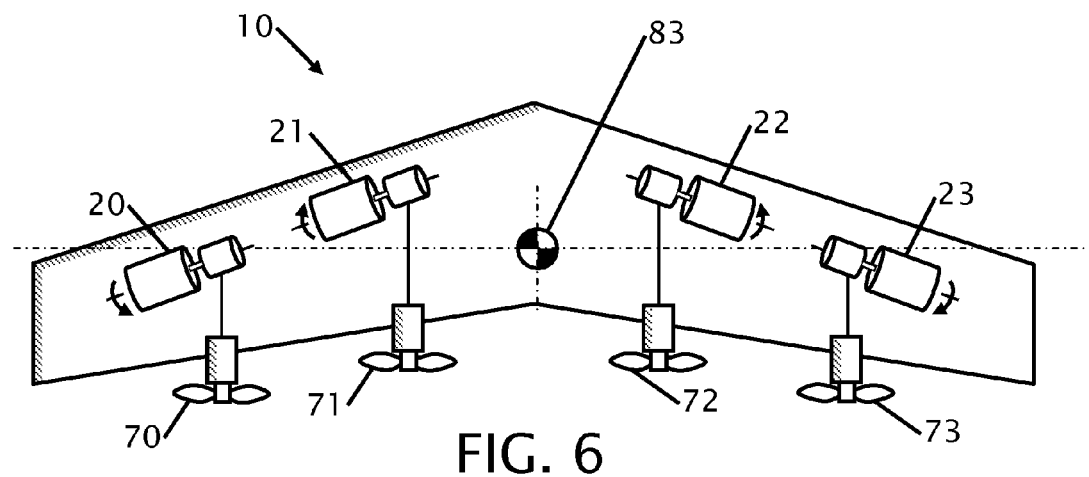
FIG. 6 shows how angle mounted flywheels provide roll control of the vehicle.

A number of embodiments are available for flywheel placement and alignment to enable three-axis control of the vehicle. As a modification to the orientation shown in FIGS. 1 and 2, the flywheels can be aligned at an angle as shown in FIG. 6 such that a component of the net moments is reflected to the roll axis. The differences in the moments between each counter-rotating pair can then be used to maintain roll control of the vehicle.

Figure 7:
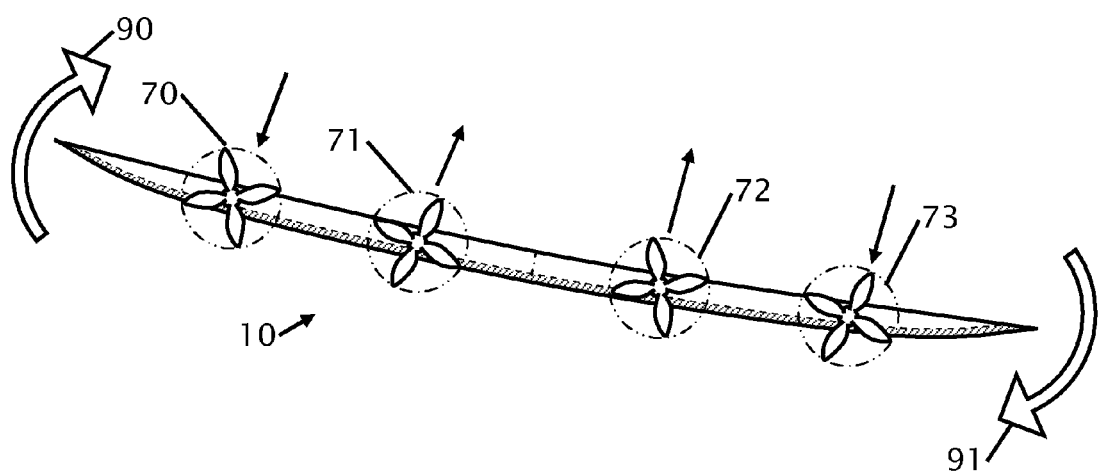
FIG. 7 shows how gyroscopic couples produced by the flywheels assist in turning the vehicle.

Another feature of the design uses the gyroscopic couples of the wheels to assist in turning the vehicle. If the vehicle, as shown in FIG. 2, is turned toward the right by increasing the propeller force on the left side of the wing, then the angular momentum of the spinning flywheels 20-23 is changed due to the rotation of the wing. This change in angular momentum puts gyroscopic forces on the wing as shown in FIG. 7, thus assisting in creating a bank angle 90 and 91 for the vehicle 10 with propellers 70-73. The roll control, as shown in FIG. 6, is used to counter the effect of the gyroscopic couples and return the vehicle to a flat position when the turn is complete.

Yaw control of the vehicle is attained by controlling the propeller pairs on each side of the wing to attain the desired direction of flight. Three axis stabilized control (pitch, roll, and yaw) is attained by varying the pitch of individual propellers according to a predefined control law. Each of the four propellers 70-73 is driven individually by its associated flywheel 20-23 generator/inverter 34-37 pair during sunlight. Conversely, the propellers 70-73 place a load on the flywheels 20-23 which has the effect of dragging down, or reducing, their speeds during eclipse periods. The complete control law flies the vehicle 10 at the desired speed to minimize the required drive power while maintaining three axis controls for stabilized flight. While performing these functions, the control law must also insure that the flywheels 20-23 are charged to their maximum capacity prior to entering an eclipse period. The wing design 10 shown in the figure is a swept back wing. However, this control approach can be used for a straight wing design as well.

Figure 8:
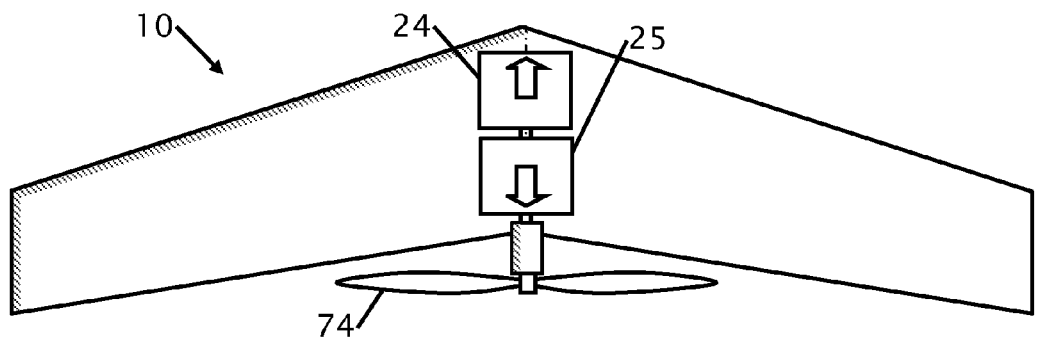
FIG. 8 shows how a pair of counter-rotating flywheels can counter the torque produced by the propeller of a flying vehicle.

While the discussion above describes the complete control of the vehicle using flywheel moments without the need for conventional air vehicle control devices such as flaps, ailerons, and a tail section, the flywheels can be used in combination with these conventional control devices to provide vehicle control as a part of this invention. The flywheels may be used to provide one or two axis of control or to assist the conventional control devices in any of the three axes to steer the vehicle with the goal of reducing vehicle power and weight. One such embodiment is shown in FIG. 8. In this embodiment, a pair of counter-rotating flywheels 24 and 25 is aligned with the rotational axis of a single propeller 74 on a vehicle 10. In this configuration, the net torques created by the counter-rotating flywheel pair is used to counter the torque placed on the vehicle by the rotating propeller with the goal of stabilizing the vehicle in the roll axis. Conventional controls are used in conjunction with the flywheel pair to provide three-axis control of the vehicle.

Figure 9:
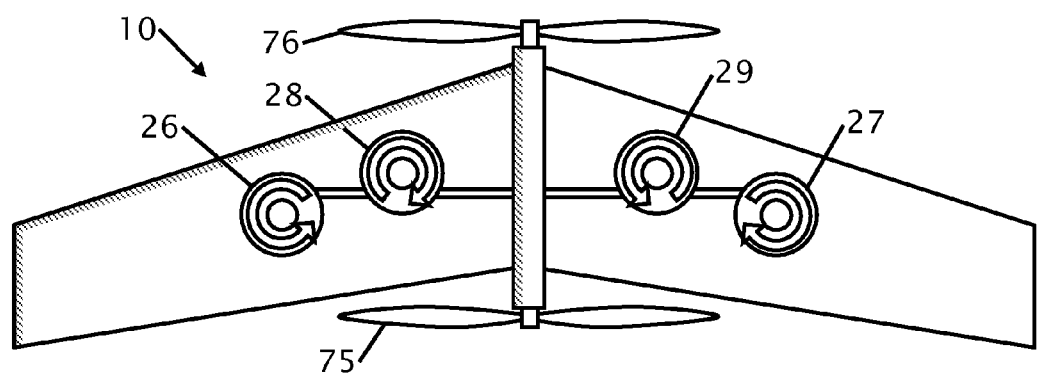
FIG. 9 shows an alternate configuration using a pair of counter-rotating flywheels.

A further contemplated embodiment is shown in FIG. 9 where counter-rotating flywheels 26-29 are placed flat on opposing sides of the wing of the vehicle 10 with their spin axis perpendicular to the plane of the wing to drive push and pull propellers 75 and 76 respectively.

A suite of avionics contains the vehicle controller as well as the transmitters and receivers necessary to communicate with the vehicle. The controller collects sensor data and performs the control law as well as vehicle diagnostics to determine state-of-health. The vehicle contains the necessary sensors and actuators to perform these functions. The vehicle can be flown from the ground or will fly autonomously.

In an embodiment of the present design, receptors are embedded on the bottom of the wing to allow reception of laser or microwave power beamed from the ground. The receptors convert the beamed power to dc electrical power to be used by the vehicle in the same fashion as the solar energy.

Thus, specific embodiments of a solar powered airplane have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. An aircraft comprising:
a horizontally extending wing section;
a plurality of solar collecting cells disposed on at least a top surface of said horizontal extending wing section;
at least one motor electrically connected to said plurality of solar collecting cells and disposed within or on said horizontal extending wing section that is engaged onto a propeller that provides propulsion;
at least one motor/generator electrically connected to said plurality of solar collecting cells and coupled to at least two sets of counter-rotating pairs of flywheels means for a function to store and discharge energy that provides said propulsion wherein said flywheels are oriented with their spin axis along or perpendicular to the pitch axis of said horizontally extending wing section, and
wherein angular inertia from at least one flywheel is combined with thrust from said propeller to steer said aircraft.

2. The aircraft according to claim 1 wherein said aircraft in flight is controlled without a use of elevators and or tails.

3. The aircraft according to claim 1 wherein thrust from said propellers is controlled by altering a pitch of said propellers.

4. The aircraft according to claim 1 wherein thrust from said propellers is controlled by a speed control circuit between said at least one flywheel motor/generator and said at least one motor and said propellers operate with fixed pitch.

5. The aircraft according to claim 1 that further includes at least one inverter power controller that converts energy from said plurality of solar collecting cells into voltage and current used to drive said at least one motor/generator and said at least one motor.

6. The aircraft according to claim 1 wherein said flywheels produce angular momentum that is used to alter the flight of said aircraft.

7. The aircraft according to claim 1 wherein at least a pair of flywheels is used and each flywheel of said pair of flywheels rotates in opposite directions to offset rotational gyroscopic and moment effects.

8. The aircraft according to claim 1 wherein said at least one flywheel is orientated in a planar relationship with said horizontally extending wing section.

9. The aircraft according to claim 1 wherein said at least one flywheel is orientated perpendicular to a planar relationship of said horizontally extending wing section.

10. The aircraft according to claim 1 that further includes an avionics control system that provides control of power flow between said solar collectors, inverters, flywheels, flywheel motor/generators, motors and a propeller pitch drive system.

11. The aircraft according to claim 1 wherein energy from said plurality of solar collecting cells is not stored in batteries for propulsion.

12. The aircraft according to claim 1 wherein said flywheel pairs are aligned with a center of gravity of said horizontally extending wing section with respect to a pitch axis of said aircraft to counter airfoil pitching moments.

13. The aircraft according to claim 1 wherein torque and or speed conversion from said plurality of solar collecting cells and flywheels is from a 2 pole motor/generator on said flywheels to a motor having up to 160 pole motor that is engaged on said propeller.

14. The aircraft according to claim 1 wherein power from said plurality of solar collecting cells is converted to three phase ac power by at least one solid state inverter and said three phase ac power simultaneously puts energy into said at least one flywheel while driving said at least one propeller motor and said at least one motor/generator that is coupled to said at least one flywheel.

15. The aircraft according to claim 10 wherein said avionics further collects sensor data and performs control of said aircraft as well as aircraft diagnostics.

16. The aircraft according to claim 10 wherein said aircraft is flown from a remote location.

17. The aircraft according to claim 10 wherein said aircraft is flown autonomously.

18. The aircraft according to claim 1 that further includes receptors embedded on a bottom of said horizontally extending wing section wherein said receptors allow reception of beamed laser or microwave power that is stored in said at least one flywheel.

19. The aircraft according to claim 1 wherein said at least one flywheel provides energy to said motor/generator during periods of limited sunlight and or darkness by converting kinetic energy to electrical energy.

* * * * *